United States Patent [19]
DeSalvo et al.

[11] Patent Number: 5,111,599
[45] Date of Patent: May 12, 1992

[54] BRUSH CLEARING IMPLEMENT

[76] Inventors: Stanley A. DeSalvo; Diane Scissons, both of R.R. #1, Lombardy, Ontario, Canada, K06 1L0

[21] Appl. No.: 608,461

[22] Filed: Nov. 2, 1990

[30] Foreign Application Priority Data

Jan. 19, 1990 [CA] Canada ................................. 2008203

[51] Int. Cl.⁵ .............................................. E02F 3/76
[52] U.S. Cl. ........................................ 37/2 R; 37/120; 37/141 R; 171/105
[58] Field of Search ............... 37/2 R, 117.5, 120, 37/121, DIG. 3, 141 R, 142 R; 171/55, 59, 105, 107; 56/52, 53, 119, 327.1

[56] References Cited

U.S. PATENT DOCUMENTS

| | | | |
|---|---|---|---|
| 978,661 | 12/1910 | Scwartzman | 37/120 |
| 989,262 | 4/1911 | Hollowell | 37/120 |
| 1,341,750 | 6/1920 | Johnson | 37/120 |
| 2,299,310 | 10/1942 | Dammeyer | 37/121 X |
| 2,306,803 | 12/1942 | Hilblom | 37/121 X |
| 2,857,690 | 10/1958 | Yake et al. | 37/120 |
| 3,094,348 | 6/1963 | Preziosi | 37/120 X |
| 3,527,035 | 9/1970 | Byrd | 56/119 |
| 4,538,404 | 9/1985 | Heimark. Jr. et al. | 56/119 X |

FOREIGN PATENT DOCUMENTS 1355693  2/1964  France ................................. 37/120

Primary Examiner—Randolph A. Reese
Assistant Examiner—J. Russell McBee
Attorney, Agent, or Firm—Shapiro, Cohen, Andrews, Finlayson

[57] ABSTRACT

An implement for uprooting and removing bushes and small trees from pasture land. The device is adapted to be mounted on a tractor having a front end loader assembly and includes a transverse horizontal bar having tooth like projections along its leading edge. The teeth are long and reinforced for greater strength.

Channels are defined by the teeth and shaped to provide narrow openings at the roots of the teeth to grasp small bushes. The wider mouth of each channel between teeth will accommodate larger stems or trunks. Brush is conveniently uprooted and transported by the tractor mounted device.

3 Claims, 2 Drawing Sheets

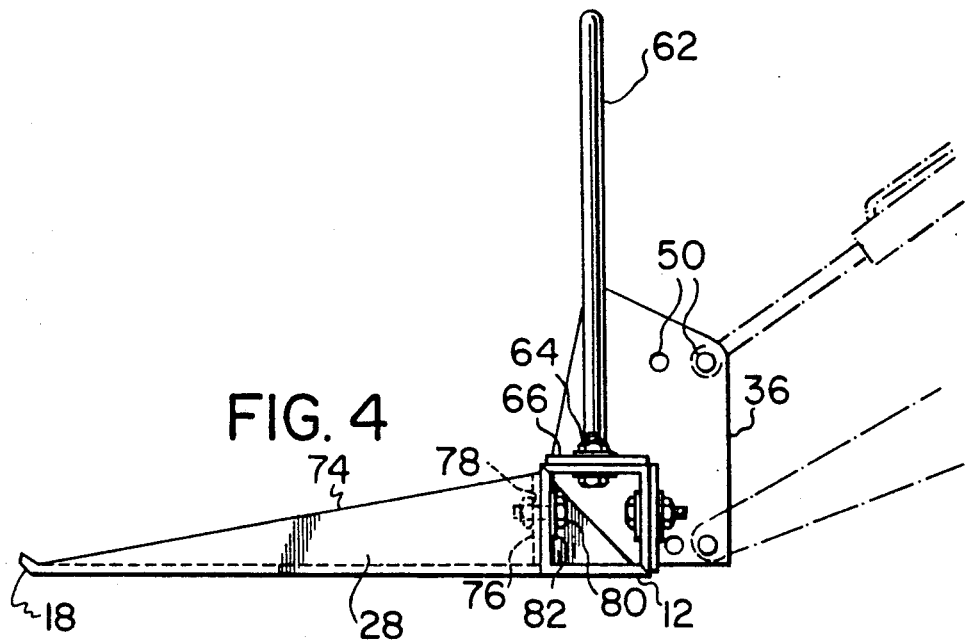
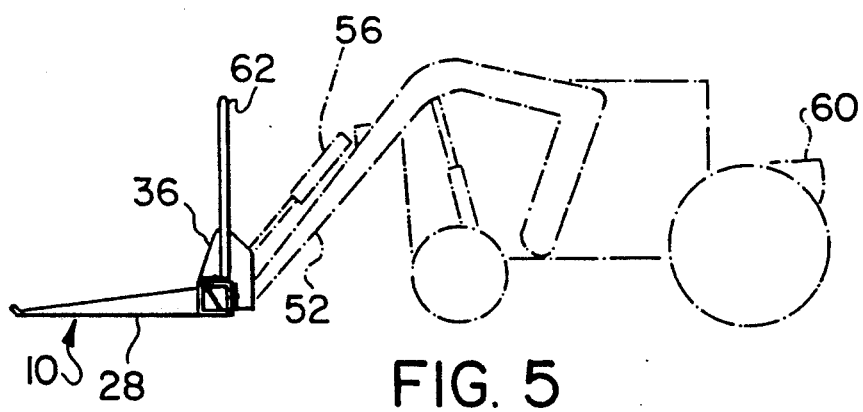

BRUSH CLEARING IMPLEMENT

This invention relates to hydraulically operated tractor mounted implements and more particularly to a brush removal implement for removing brush, small trees and the like from areas such as pasture land.

BACKGROUND OF THE INVENTION

The encroachment of unwanted plants from forest or swamp on cultivated areas or pasture land has long been a problem. Species such as cedar or juniper shade or cover grass therby reducing the available pasture area. Control by chemical spray is not considered by some environmentalists to be a good solution and frequent mowing and individual extractions by hand when plants are small is too labour intensive. Furthermore some plants have thorns and other characteristics which make such hand labour disagreeable. A further consideration is that merely cutting brush leaves all the roots in the ground to cause other problems including regrowth and difficulties in reseeding.

BACKGROUND PRIOR ART

Various implements called grubbers have been proposed for attaching to a power shovel as shown for example in the Williams patent, U.S. Pat. No. 2,303,415 or on bulldozer blades as shown for example in the Schnore patent, U.S. Pat. No. 2,836,708. A number of patents disclose tree and stone grubbers have vertical lifting mechanisms for use in connection with tractor mounted systems including those disclosed for example in Tutle U.S. Pat. No. 2,734,290, Zogg et al U.S. Pat. No. 2,735,198 and U.S. Pat. No. 4,356,644.

The above mentioned patents disclose devices intended for use with the vertical hoisting arrangement on the back of a conventional tractor rather than the front end due to the intended use of the implement for digging up trees, plants or stones.

SUMMARY OF THE INVENTION

The present invention relates to a hydraulically operated implement for brush removal which is adapted to be mounted on a farm tractor having a front end loader. The implement is preferably mounted in place of the standard bucket of the loader.

One advantage of the present invention is that it provides for better maneuverability of the tractor with the result that brush can be moved to a pile as it is uprooted.

A further advantage of the present invention is that positioning the attachment with respect to the stem of a bush is simplified and a number of small bushes may be removed simultaneously with minimum cutting of the stems. The implement facilitates clearing a swath and removing a greater percentage of the roots of the bushes while minimizing disturbance of the surrounding soil.

It is an object of the present invention to provide other advantages such as ease of transporting and unloading of uprooted bushes.

A still further object of the invention is the provision of an economical brush clearing implement which is readily installed on a tractor equipped with a conventional front end loading apparatus.

Accordingly the present invention provides an implement for uprooting bushes adapted to be mounted on a tractor having a front end loading apparatus. The implement comprises a substantially horizontal transversely extended bar, a plurality of pointed tooth like projections mounted along the bar, the tooth like projections defining V shaped channels therebetween and a pair of spaced apart brackets on the bar for connection to lifting members on the front end loader.

DESCRIPTION OF THE DRAWINGS

In the accompanying drawings which illustrate a preferred embodiment of the invention

FIG. 4 is an end view of the invention showing frame members and hydraulic attachments and FIG. 5 is a schematic of the implement attached to a tractor.

Figure 1:
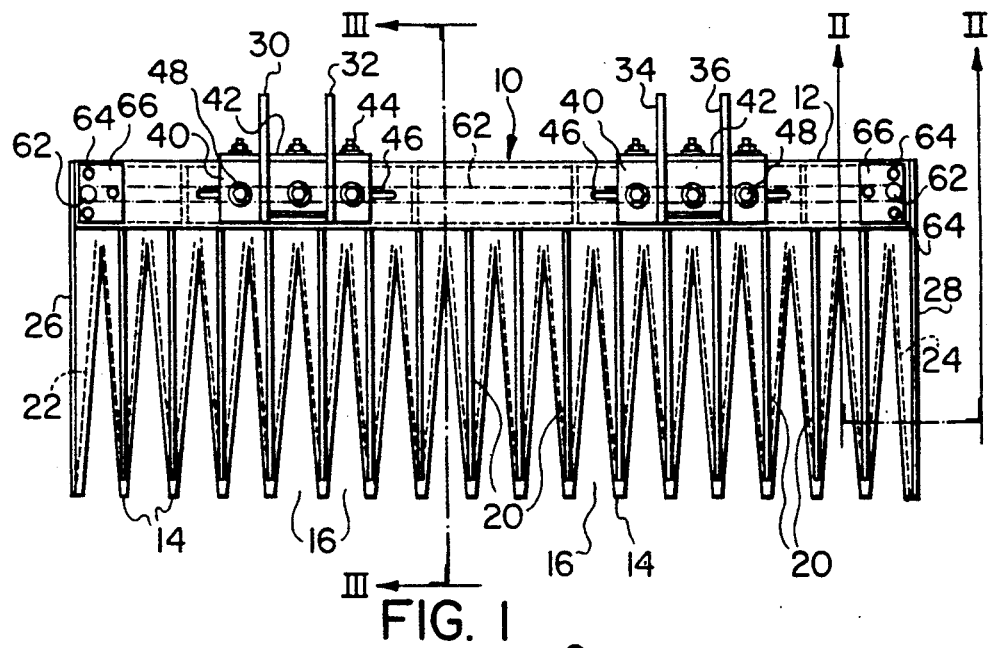
FIG. 1 is a top plan view of the brush clearing implement of this invention

Referring now in detail to the drawings, a brush clearing implement shown generally at 10 in FIG. 1 includes a horizontal bar 12 having a plurality of pointed tooth like projections 14 mounted thereon to define V shaped channels 16 between the teeth 14. The material used for the bar 12 may be constructed of two right angle members 12a and 12b welded to form box tubing and the teeth 14 may be secured on the bar 12 as by welding.

Figure 2:
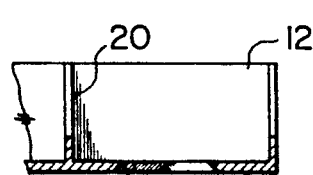
FIG. 2 is a section taken along the line 2—2 of FIG. 1

Box steel tubing may also be used to form the bar 12 and the teeth 14 may be secured thereto by bolts (see FIG. 4). As shown in FIG. 2 the edges 15 of the teeth 14 are bevelled for reasons to be described below.

As shown more clearly in FIG. 4 each tooth 12 has an up turned point at 18. To increase the rigidity of each tooth 14 a raised rib 20 is secured along the centerline by welding. At the ends of the bar 12 the half teeth 22 and 24 are strengthened by plates or ribs 26 and 28 which also close the ends of the bar 12.

Pairs of upright plates 30, 32, 34 and 36 are welded to plates 40 and 42 which are secured to the bar 12 by bolts 44 received in slots 46 in the bar 12. Bolts 44 are assembled on the angle members 12a before welding members 12a and 12b together. The heads of the bolts are welded to a plate 13 to prevent turning and to serve as a reinforcing washer. Nuts 48 threadedly received on the bolts 44 may be loosened to adjust the spacing between pairs of the upright plates 30, 32, 34 and 36 to facilitate mounting the implement on various makes of tractors. Similarly the plates may be provided with a number of apertures 50 to provide for attachment to the lifting arms of more than one make of tractor.

Figure 3:
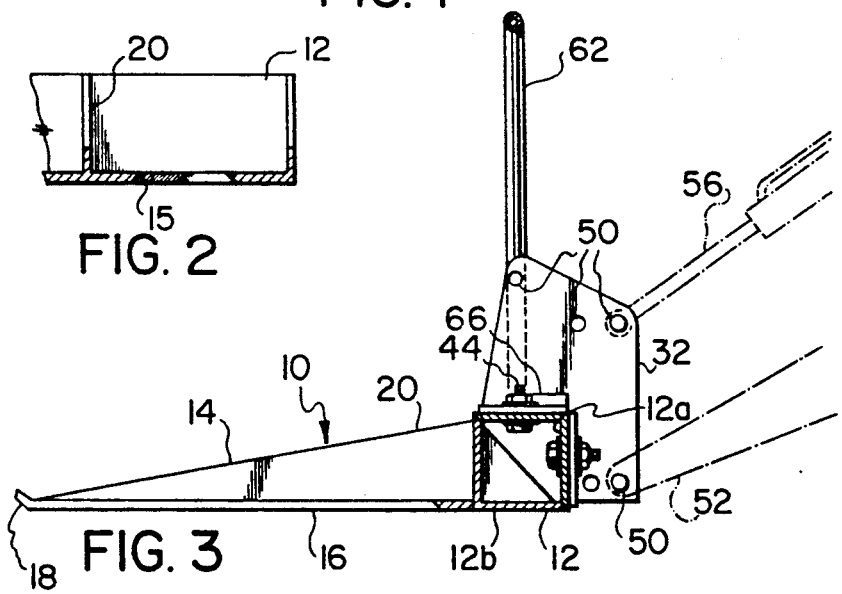
FIG. 3 is a section taken along the line 3—3 of FIG. 1
Figure 3A:
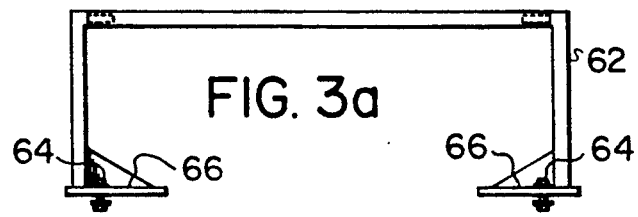
FIG. 3a is a front view of a guard attachment

As shown in broken lines in FIG. 3 and by way of illustration in FIG. 5 a frame member 52 of a tractor 60 is secured to the plates 30 and 32 as by pins not shown in a conventional manner. A second frame member 52 (not shown) is also secured to the other plates 34 and 36. Similarly the other hydraulic piston assembly 56 of the front end loader is secured to associated plates 34 and 36.

A guard rail 62 constructed of tubing or other suitable shaped material is conveniently bolted or otherwise secured to the bar 12 as by bolts 64 extending through brackets 66, if required, to prevent brush from falling back on the tractor during loading or carrying operations.

It should be noted that the bevelled edges 15 of the teeth 14 are designed to grip rather than cut stems of bushes or trees so that upward movement of the implement does not tend to chisel the bark of a small tree, although the edges of the teeth will bite into a tree trunk to provide maximum gripping action. The amount of bevel 15 may vary from one end of the tooth 14 to the other. Preferrably there is less bevel provided at the inner end of the tooth 14.

Furthermore the length of the teeth are at least twice that of known digging tools and preferrably four times their width thereby providing a long gradually tapered channel 16 between teeth 14 to accommodate various diameters of stems. In order to provide the necessary strength for such extra long teeth 14, ribs 20, 26 and 28 have been welded thereto.

With reference to FIG. 4, teeth 74 similar to the teeth 14 are provided with an end plate 76 having a pair of apertures 78 (one of which is shown) to receive bolts 80 having their heads welded to a metal strip 82 inserted through the ends of the tube 12.

In operation the implement 10 having been mounted on a tractor 60 as illustrated in FIG. 5, is moved along parallel to and approximately 3 to 10 inches above the ground until the teeth 14 of the implement 10 engage a trunk, a stem or stems of bushes or trees to be uprooted. It has been found that engaging larger trees approximately 10 inches above the ground facilitates their removal.

The implement 10 is then pushed forward or raised by the hydraulic assembly or a combination or these movements to uproot the bush or tree. The load of brush can be conveniently tilted back to move to a storage pile and tilted forward for unloading purposes. Dragging the implement backward may also be necessary to disengage larger bushes or trees from the teeth 14.

We claim:

1. An implement for uprooting bushes and trees adapted to be mounted on a tractor having a front end loading apparatus, said implement comprising a substantially horizontal transversely extending bar having a front side and a back side, a plurality of pointed tooth-like projections mounted along said bar in side by side relation, said tooth-like projections having first and second tapered elongated side edges with the ends of said side edges of adjacent tooth-like projections which abut said bar converging so as to form an apex forward of said front side of said bar thereby defining V-shaped openings between said adjacent tooth-like projections such that said V-shaped openings are narrow at the end adjacent said front side of said bar and wide at the opposite end, said tooth-like projections being constructed and arranged in order to engage bushes and trees of varying diameters and retain said bushes and trees to uproot said bushes and trees, and a pair of spaced apart brackets on said bar for connection to lifting members on said front end loading apparatus.

2. A bush and tree uprooting implement as claimed in claim 1 further comprising a substantially triangular rib extending along a center line of each of said tooth-like projections so that a major end portion of said triangular rib is secured to said bar, and a pair of spaced apart adjustable brackets slidably mounted on said bar for longitudinal movement for connection to associated ends of said lifting members to provide vertical movement of said implement.

3. An implement as claimed in claim 2 wherein said first and second side edges of said pointed tooth-like projections are bevelled to provide an undercut with respect to said V-shaped openings so that during upward movement of the implement gripping rather than cutting action is obtained.

* * * * *